June 6, 1944.　　　J. VERDERBER　　　2,350,432
MEASURING DEVICE
Filed Sept. 9, 1941　　　2 Sheets-Sheet 1

FIG. I.

INVENTOR.
JOSEPH VERDERBER
BY
ATTORNEYS

June 6, 1944.  J. VERDERBER  2,350,432
MEASURING DEVICE
Filed Sept. 9, 1941  2 Sheets-Sheet 2

INVENTOR.
JOSEPH VERDERBER
BY Fay, Macklin, Golrick,
Williams, Chilton and Isley.
ATTORNEYS Patented June 6, 1944

2,350,432

UNITED STATES PATENT OFFICE 2,350,432

MEASURING DEVICE

Joseph Verderber, Cleveland, Ohio

Application September 9, 1941, Serial No. 410,185

3 Claims. (Cl. 33—172)

This invention relates, generally, to a measuring device and has reference, more particularly, to a device for accurately measuring the amount of movement between two relatively movable elements.

In my patent for Machine tool, No. Re. 21,795 dated May 6, 1941, I have disclosed means for measuring the amount of movement between two relatively movable elements, but such means require adjustment or setting before each movement to be measured has occurred and another adjustment after such movement has occurred. This is true, particularly, if such movement is for a relatively great distance, such as, for instance, one-half of an inch or more. However, where the amount of movement between two relatively movable elements is slight, the amount of such movement can be accurately determined with but one adjustment of such means, the adjustment taking place before the movement occurs. This necessity for frequent adjustment, always before and almost always after movement, has created a want for a device as above set forth which is constantly in adjustment and which does not require adjustment before nor after movement between two relatively movable elements has occurred in order to indicate the precise amount of such movement, notwithstanding movement in an amount far in excess of that above set forth. Thus, one of the cardinal objects of this invention has been to provide a device which will quickly and accurately measure very large amounts of movement between two relatively movable elements without the necessity of frequent adjustment or settings.

The disclosure of the above set forth patent includes very accurately spaced abutments, the maintenance of the original accuracy of the spacing of the working faces of which might be questioned after continued and long enduring use. Said disclosure also includes a dial indicator, the limitations and maintenance of the accuracy of which is subject to certain objections if the same undergoes use other than as a laboratory instrument. Another of the objects of this invention has been to provide a device of the character identified above in which the limitations heretofore in this paragraph set forth are eliminated to a substantial degree.

The abutments of said patent are engaged by a member and all the intergaging surfaces are exposed and consequently subject to attack by and are apt to adhere to particles of dust, grit, and other foreign matter which immediately and adversely affect the accuracy of the measurement and which, if suffered to endure, have a permanent deteriorating effect on such surfaces. Another of the objects of this invention has been to provide a device by virtue of which such effects of dust, dirt, grit, and the like are eliminated.

I have found that means constructed in accordance with my said patent is somewhat bulky and presents certain objectionable protuberances, which, at times, unduly interfere with free movement of the operator. A further object of this invention has been to provide a measuring device of the kind specified which is compact and which is free from objectionable projection.

Another of the objects of this invention is to provide a device which will very accurately measure both minute and great amounts of movement between two relatively movable elements and which will magnify such movement without the employment of a multiplicity of mechanical levers.

As has been above indicated and as can be more clearly ascertained by a study of said patent, the functioning of means constructed in accordance therewith is dependent to some extent upon the operator's ability to "feel" very accurately the proper adjustment of a micrometer—a factor dependent upon the human element of "feel" which is developed to a suitable degree only by a highly skilled operator. One of the principal features of the present invention is to eliminate the human element of "feel."

In order to insure measuring means constructed in accordance with said patent against unintentional contact and thus preserve its accuracy, it has been found desirable to locate the same in places which are more or less inconvenient. Thus, another object of this invention has been to provide a device as described which is not vulnerable to said contacts and, consequently, which can with increased safety be more conveniently located.

Further objects of this invention have been to provide a measuring device which is mechanically simple, not subject to readily becoming out of adjustment and the parts of which can be replaced without the use of specially prepared installation tools.

To the accomplishment of the foregoing and related ends, said invention, then, consists of the means hereinafter described and particularly pointed out in the claims; the annexed drawings and the following description setting forth in detail certain structure embodying the invention, such disclosed elements constituting, however, but one of various structural forms in which the principle of the invention may be used.

In said annexed drawings—

Briefly, although not necessarily condensed to the extreme, my present invention comprises a straight line presented by one of two relatively movable elements, the other of such two relatively movable elements carrying a roller which rolls along such line. The amount of rotation of said roller from any preselected zero point, as such roller rolls along the straight edge, being a simple function or direct indication of the amount that one of said elements has moved with respect to the other of said elements.

Figure 1:
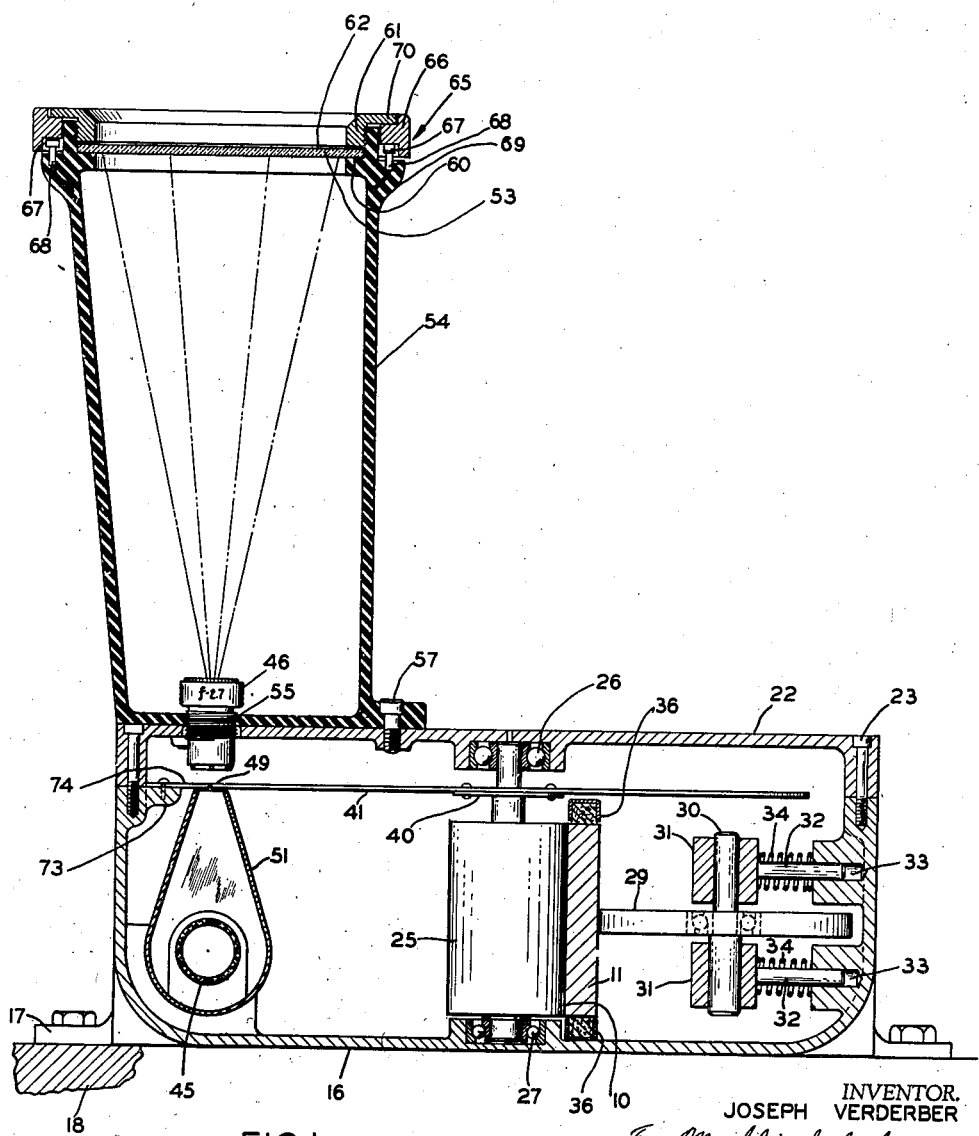
Fig. 1 is a cross section of a device having incorporated therein the principal features of this invention and is taken on the line 1—1 of Fig. 2.
Figure 2:
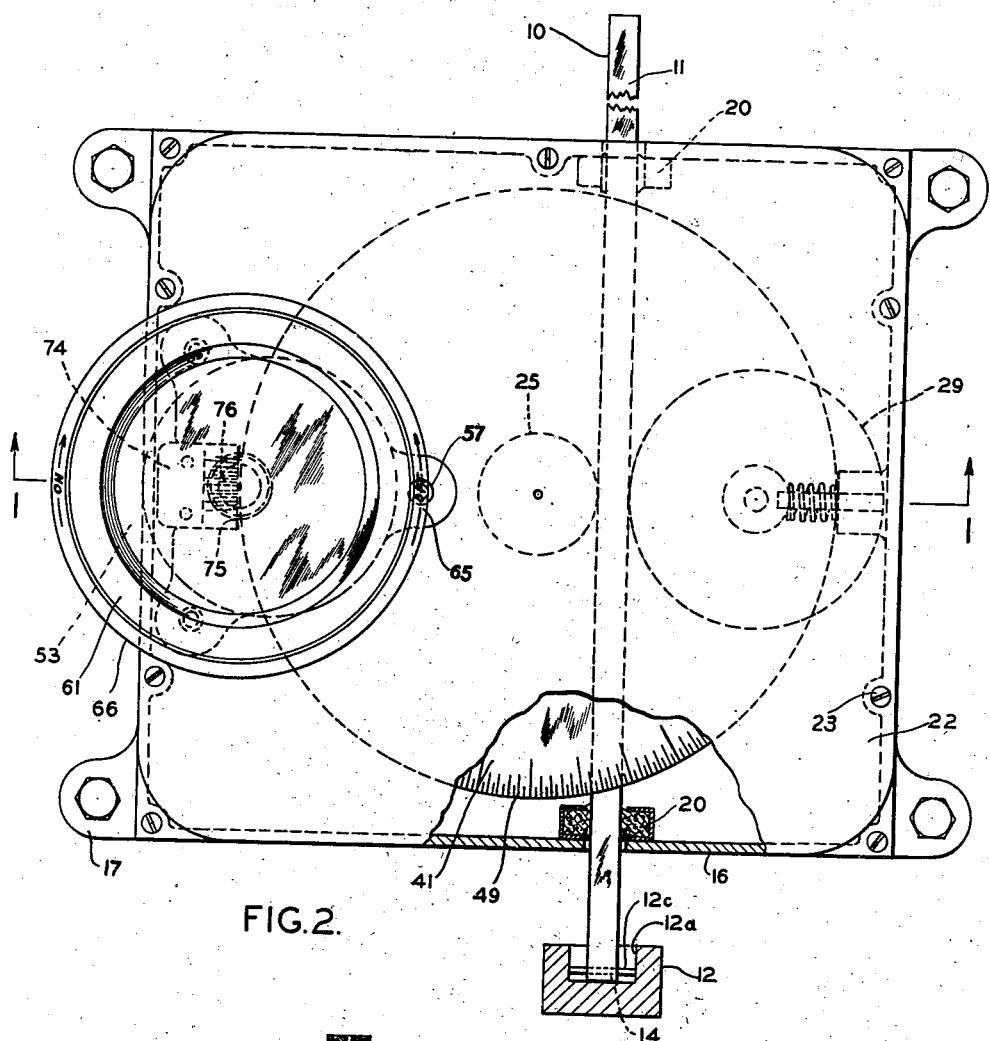
Fig. 2 is a view partially in section and partially in elevation taken from the top of Fig. 1.

With reference now to said drawings, and more specifically to Figs. 1 and 2 thereof, the said straight edge can be taken to be any one of an infinitely large number of lines comprising a flat surface 10 of an elongated member 11, preferably bar of rectangular cross-section, which is connected to an element 12. Either the latter or the member 10 may be taken to be one of the relatively movable elements. The connection between the member 11 and the element 12 is such that no relative movement therebetween is permitted along the length of the former. Thus, this connection may be pivotal about an axis parallel to said surface and perpendicular to Fig. 2, or it may be one which permits limited movement of the bar perpendicular to said surface. Thus, as is seen in Fig. 2, the element 12 is provided with a recess 12a wider than the bar 11, and adjacent to the bottom of said recess there is a ledge 12c along the side face of the recess. The bottom of the bar is provided with a projection 14 the upper face of which rides against the lower face of the ledge. Of course, a combination of both types of connections may be used. This bar is of considerable length and, as is seen in Fig. 2, projects through a frame or housing, the body, 16, of which, by suitable means such as ears 17 and bolts, is rigidly and immovably carried by an element 18. Either the housing 16 or the element 18 may be taken to be the other of the relatively movable elements.

In order to particularly prevent the entrance of dust, dirt, grit and other foreign matter into the housing and in order to keep the entire bar 11 clean and free from lubricant, the openings of the housing through which the bar projects are each provided with wiping means 20, it being noted that the said openings are of dimensions greater than the transverse cross-sectional dimension of the bar so as to permit the use of connections as above described.

The housing includes a cover 22 which is suitably maintained and located as by means of bolts 23. A roller 25 is supported at one end by the housing and at the other end by the cover and engages the surface 10.

The surface 10 and the periphery or circumferential surface of the roller are both chromium plated and finished extremely fine so as to eliminate all variation in excess of .000003 to .000004 of an inch, thus insuring substantially continuous line contact between such surfaces. These elements are maintained free of lubricant so that movement, large or small and slow or rapid, of the element 12 with respect to the element 18 will be extremely accurately reflected and equal to the length of the circumference of the roller which has rolled along the bar.

In order to further make certain the accuracy of the circumferential travel of the roller along the bar as a true measure of the amount of movement between the relatively movable elements 12 and 18, the roller is mounted as frictionlessly as possible, such as by means of roller bearings 26 and 27 carried by bosses of the cover and the housing respectively. Further, the bar is urged or maintained in contact with the roller by suitable means such as a weight, but preferably, as is better seen in Fig. 1, by means of a disc 29 in contact with that side of the bar 11 which is opposite to the surface 10. So as to permit this disc to freely roll along such side, roller bearings are interposed between the disc and a shaft 30 which is carried at both ends by bushings 31, each of which is provided with a finger 32, the ends of which project into and are slightly smaller than receiving openings 33 of bosses of the housing. Each of these fingers is surrounded by a spring 34 the ends of which engage the bushings so as to urge the disc toward the bar. To further insure maximum contact between the bar and the roller, suitable bar locating and auxiliary wiping means 36 are provided and are supported by the housing.

Suitably secured, as by welding or by other means, to the shaft of the roller 25 is a small flat disc 40 which, by means of rivets or the like, has rigidly secured thereto a flat annular plate 41. Thus, the roller 25 and plate 41 are rigidly interconnected and angular motion of the roller is transferred to the plate directly and without any lost motion or back-lash so that a measurement of the angular movement of the plate is an exact and precise measurement of the angular movement of the roller. This plate is considerably larger in diameter than is the roller 25 and I have found it convenient to make the ratio of these diameters five to one so that, for each unit of circumferential movement of the roller 25, there will be five units of circumferential movement of the disc 41 and the first multiplication or magnification of movement between the elements 12 and 18 is accomplished.

I prefer to accomplish further multiplication or magnification of such movement by means of light, preferably fluorescent, provided by a source of light 45 and a lens 46. As is seen in Fig. 2, the outer edge of the plate 41 projects between the source of light and the lens and is provided with suitable indicia 49 so that the rays of light, concentrated and directed by the light reflector 51, encounter the indicia and present an image to the lens 46. This image is magnified any desirable number of times, such as nine, and is visible on the lens remote side of a screen 53 which is in the nature of a suitably prepared glass plate which is supported by a casing 54, the latter presenting a dark chamber interconnecting and spacing the screen from the lens. For focusing purposes the lens is movable between the source of light and the screen, and is threaded as at 55 to either the housing 16 or the casing 54, the latter being suitably secured as by means of bolts 57 to the housing.

For maintaining the annular glass screen in position, I have provided the casing 54 with an interior flange 60 against the upper surface of which rests the screen which is held in place by an exteriorly threaded nut 61, there being a gasket 62 interposed between such screen and nut. If desired, this nut may be provided with an upwardly extending shield for shielding out light from exterior sources so that the screen may be better observed by the workman.

For turning the source of light on and off, I prefer to locate a switch, indicated generally by the reference character 65, in the immediate vicinity of the screen. Thus an angular ring 66 surrounds the upper portion of the casing 54 and presents electrical terminals 67 which contact other electrical terminals 68, the latter being supported by the casing in a stationary manner. It is to be understood that the ring 66 and its terminals 67 rotate with respect to the casing and, as is seen in Fig. 2, rotation thereof in the clockwise direction turns the light on and rotation thereof in a counter-clockwise direction turns the light off. For maintaining the ring 66 in position, it is disposed between an exterior flange 69 of the casing and a flange 70 of the nut.

In order to present a zero point for the indicia 49 and in order to interpolate between the marks of such indicia, there is supported by an interiorly disposed ear 73 of the housing, as by a small screw or rivet or the like, a plate 74 presenting an arcuate inner edge 75 adapted to mate with the outer edge of the plate 41. This edge 75 is also disposed between the source of light and the screen and presents vernier markings 76. It will, of course, be understood that for the indicia 49 and markings 76 to create an image on the screen, such indicia and markings must either be more susceptible to penetration by light than the plates 41 and 74, or the susceptibility may be reversed. I prefer, however, to make the plates 41 and 74 relatively clear and transparent and the indicia and markings relatively opaque. Thus, not only is the amount of relative movement between the elements 12 and 18 multiplied by a ratio of five to one, but such increased movement is further greatly magnified by the image produced on the screen and a vernier, visible on the screen, is provided for interpolating small increments of such movement. It will of course be understood that the markings 76 of the vernier could be a permanent part of the screen in which event the plate 74 would be completely eliminated.

For quickly measuring relatively large amounts of movement between the elements 12 and 18 without the necessity of the operator's observing the number of rotations of the plate 41, means may be provided for mechanically counting the number of such rotations, but I prefer that one of the elements 12 and 18 be provided with an elongated graduated scale disposed in the direction of relative movement and the other of such elements I prefer to provide with a zero point and vernier marking.

In view of the foregoing it will be seen that in order to measure the amount of relative movement, one needs simply to note a reading on the screen before the movement has occurred and again after it has occurred, the difference between such readings being the amount of relative movement. All this is accomplished without any adjustment of the measuring device because the housing 16 and the casing 54 are completely sealed in, the wiping means being noted, dust, grit and other foreign matters are eliminated from the working surfaces of a device constructed in accordance with my invention. The housing 16 and the casing 54 substantially completely enclose the working element of my invention, leaving exposed only certain portions of the element 10. The original magnification of the relative movement being accomplished by means of what is in effect a single, rigid member and the final magnification being accomplished by light, the presence of mechanical levers for magnification purposes is eliminated.

Figure 3:
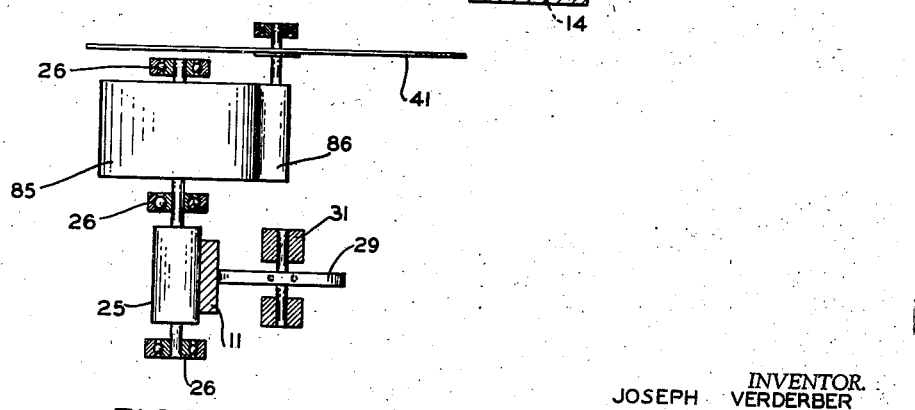
Fig. 3 is a diagrammatic view of a device having incorporated therein the main features of a modification of this invention.

A modification of this preferred form of my invention is seen in Fig. 3, wherein elements identical to those above are described and are identified by reference characters identical to those above employed. In this reference the shaft of the roller 25 carries a roller 85, which is approximately five times the diameter of roller 25, and a roller 86 is in rolling contact with the roller 85, the shaft of the former carrying the plate 41. The roller 86 is one-fifth the diameter of the roller 85. From this it will be obvious that the ratio of movement between the elements 25 and 41 of the modification is considerably larger than is true of the preferred form of this invention. It will be understood that the source of light, the indicia, the vernier, and the screen are the same in both forms of my invention, only the differences being illustrated. The finish of the rollers 85 and 86 is similar to that above described with respect to the roller 25 of the preferred form of my invention, such rollers being preferred over mechanical levers or gears inasmuch as it is desired to eliminate all lost motion and backlash.

Other forms may be employed embodying the features of my invention instead of the one herein explained, change being made in the form or construction, provided the elements stated by any of the following claims or the equivalent of such stated elements be employed.

I therefore particularly point out and distinctly claim as my invention:

1. In a device for measuring relative movement between two relatively movable parts, a member carried by one of said parts and presenting a straight edge disposed in the direction of relative movement of said parts, said member being movable with respect to said one part other than in said direction and immovable in said direction, a housing carried by the other of said parts and having a pair of openings through which said straight edge projects, a roller in said housing and adapted to contact said straight edge, a disc carried by said housing and adapted for rolling against said member along a surface of the latter which is remote from said straight edge, a pair of springs interposed between said housing and the axis of said disc for urging said disc towards said member and consequently for urging said straight edge towards said roller, said springs being disposed on opposite sides of said disc, a circular plate actuated by said roller and having indicia on the outer edge thereof, said indicia and said plate being of contrasting susceptibility to penetration by light, a source of light for projecting light rays on said outer edge whereby an image is created, a screen for receiving said image, and a lens interposed between said outer edge and said screen for magnifying said image, there being a zero point for said indicia whereby movement by one of said parts with respect to the other of said parts causes a change of image on said screen and the amount of relative movement of said parts is readily ascertainable.

2. In a device adapted for measuring relative movement between two parts, transparent means including indicia responsive to relative movement of said parts, a source of light for projecting the image of said indicia on a screen, a screen for receiving said image, a ring surrounding said screen, and electrical switching means responsive to movement of said ring for turning said source of light on and off.

3. A pair of relatively movable parts, a roller carried by one of said parts, a rigid member presenting a straight edge for contacting said roller and being movably carried by the other of said parts in a direction away from said roller, an element carried by said one part and in contact with said member, said edge being between said roller and said element, means for urging said element and said roller towards each other, and means for measuring the amount of rotation of said roller while the latter rolls along said edge whereby relative movement of said parts in the direction of said straight edge is measured.

JOSEPH VERDERBER.